United States Patent
Hedman et al.

(10) Patent No.: US 12,114,197 B2
(45) Date of Patent: Oct. 8, 2024

(54) CONGESTION CONTROL IN AMF AND SMF

(71) Applicant: Telefonaktiebolaget LM Ericsson (publ), Stockholm (SE)

(72) Inventors: Peter Hedman, Helsingborg (SE); Ivo Sedlacek, Hovorcovice (CZ); Juying Gan, Shanghai (CN); George Foti, Dollard des Ormeaux (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 409 days.

(21) Appl. No.: 17/429,865

(22) PCT Filed: Feb. 14, 2020

(86) PCT No.: PCT/IB2020/051274
§ 371 (c)(1),
(2) Date: Aug. 10, 2021

(87) PCT Pub. No.: WO2020/165864
PCT Pub. Date: Aug. 20, 2020

(65) Prior Publication Data
US 2022/0141700 A1 May 5, 2022

Related U.S. Application Data

(63) Continuation of application No. PCT/CN2019/075020, filed on Feb. 14, 2019.

(51) Int. Cl.
*H04W 28/02* (2009.01)
*H04W 48/04* (2009.01)

(52) U.S. Cl.
CPC ... *H04W 28/0226* (2013.01); *H04W 28/0289* (2013.01); *H04W 48/04* (2013.01)

(58) Field of Classification Search
CPC ......... H04W 28/0226; H04W 28/0289; H04W 48/04; H04W 88/14; H04W 92/24;
(Continued)

(56) References Cited

U.S. PATENT DOCUMENTS

| 2019/0191330 | A1* | 6/2019 | Dao | ............... H04L 69/22 |
| 2019/0357118 | A1 | 11/2019 | Kim et al. | |
| 2020/0336937 | A1* | 10/2020 | Youn | ............... H04W 48/16 |

FOREIGN PATENT DOCUMENTS

| CN | 108307443 A | 7/2018 |
| CN | 109257769 A | 1/2019 |

(Continued)

OTHER PUBLICATIONS

Qualcomm 3gPP TSG-SA WG2 Meeting # 130-S2-1901259 PS data off status update when congestion control is applied in AMF Jan. 2019 (Year: 2019).*

(Continued)

*Primary Examiner* — Rina C Pancholi
(74) *Attorney, Agent, or Firm* — Weisberg I.P. Law, P.A.

(57) ABSTRACT

A method implemented in an access and mobility management function, AMF, node that implements at least one congestion control process is provided. A message including a first indication that the message is exempt from the at least one congestion control process is received by a UE. The message is forwarded to the SMF either with the exempt indication or, if this is missing, an indication that the AMF applies a congestion control. The SMF, only when receiving the forwarded message with the additional information inserted by the AMF, carries out a validation of the message of the UE, thus preventing that a UE tags a message to be exempted from congestion control, when it should be not be exempt.

12 Claims, 8 Drawing Sheets

BEGIN

When The WD Changes A Data Off Status When The WD Is In A Non-Allowed Area, Then Accept And Forward A Session Management Message From The WD To A Session Management Function, The Session Management Message Indicating That Congestion Control Is Activated S134

END

(58) Field of Classification Search
CPC ... H04L 67/141; H04L 67/142; H04L 67/143; H04L 67/14
See application file for complete search history.

(56) References Cited

FOREIGN PATENT DOCUMENTS

| | | |
|---|---|---|
| CN | 110431805 A | 11/2019 |
| WO | 2019074347 A1 | 4/2019 |
| WO | 2019159567 A1 | 8/2019 |

OTHER PUBLICATIONS

Egyptian Office Action with English Summary dated Jul. 24, 2023 for Patent Application No. 2021061022, consisting of 10 pages.
International Search Report and Written Opinion dated May 19, 2020 for International Application No. PCT/IB2020/051274 filed Feb. 14, 2020, consisting of 10-pages.
3GPP TS 23.501 V15.4.0; 3rd Generation Partnership Project; Technical Specification Group Services and System Aspects; System Architecture for the 5G System; Stage 2 (Release 15), Dec. 2018, consisting of 236-pages.
3GPP TS 24.501 V15.2.1; 3rd Generation Partnership Project; Technical Specification Group Core Network and Terminals; Non-Access-Stratum (NAS) protocol for 5G System (5GS); Stage 3 (Release 15), Jan. 2019, consisting of 455-pages.
3GPP TS 23.503 V15.4.0; 3rd Generation Partnership Project; Technical Specification Group Services and System Aspects; Policy and Charging Control Framework for the 5G System; Stage 2 (Release 15), Dec. 2018, consisting of 76-pages.
3GPP TS 23.502 V15.4.1; 3rd Generation Partnership Project; Technical Specification Group Services and System Aspects; Procedures for the 5G System; Stage 2 (Release 15), Jan. 2019, consisting of 347-pages.
3GPP TS 23.228 V15.3.0; 3rd Generation Partnership Project; Technical Specification Group Services and System Aspects; IP Multimedia Subsystem (IMS); Stage 2 (Release 15), Sep. 2018, consisting of 330-pages.
3GPP TS 23.221 V15.1.0; 3rd Generation Partnership Project; Technical Specification Group Services and System Aspects; Architectural requirements (Release 15), Dec. 2018, consisting of 53-pages.
3GPP TS 22.011 V16.4.0; 3rd Generation Partnership Project; Technical Specification Group Services and System Aspects; Service accessibility (Release 16), Dec. 2018, consisting of 33-pages.
3GPP TSG-SA WG2 Meeting #130 S2-1901389 (revision of S2-1901259); Title: PS Data Off status update when congestion control is applied in AMF; Source to WG: Qualcomm Incorporated, Intel, KPN, Ericsson; Source to TSG: SA2; Work Item Code: 5GS_Ph1; Date and Location: Jan. 21-25, 2019, Kochi, India, consisting of 5-pages.
3GPP TSG CT WG1 Meeting #115 C1-191019; Title: Reply LS on 3GPP PS data off and congestion control applied by AMF; Source: SA2; Reply to: LS on 3GPP PS data off and congestion control applied by AMF; Release: Release 15; Work Item: 5GS_Ph1; Date and Location: Feb. 25-Mar. 1, 2019, Montreal (Canada), consisting of 2-pages.
3GPP TSG-SA WG2 Meeting #130 S2-1901259 (revision of S2-1901098); Title: PS Data Off status update when congestion control is applied in AMF; Source to WG: Qualcomm Incorporated, Intel, KPN, Ericsson; Source to TSG: SA2; Work Item Code: 5GS_Ph1; Date and Location: Jan. 21-25, 2019, Kochi, India, consisting of 5-pages.
Korean Notice of Preliminary Rejection and English Summary dated Sep. 7, 2023 for Application No. 2021-7022344, consisting of 6 pages.
SA WG2 Meeting #130 S2-1901335; Title: Reply LS on 3GPP PS data off and congestion control applied by AMF; Reply to: LS on 3GPP PS data off and congestion control applied by AMF (C1-188927/S2-1900033); Release: Release 15; Work Item: 5GS_Ph1; Source: SA2; Date and Location: Jan. 21-25, 2019, Kochi, India, consisting of 1-page.
Chinese Notice of Allowance dated May 31, 2024 and English Translation of Chinese Notice of Allowance issued in Chinese Patent Application No. 202080014225.6, consisting of 13 pages.

* cited by examiner

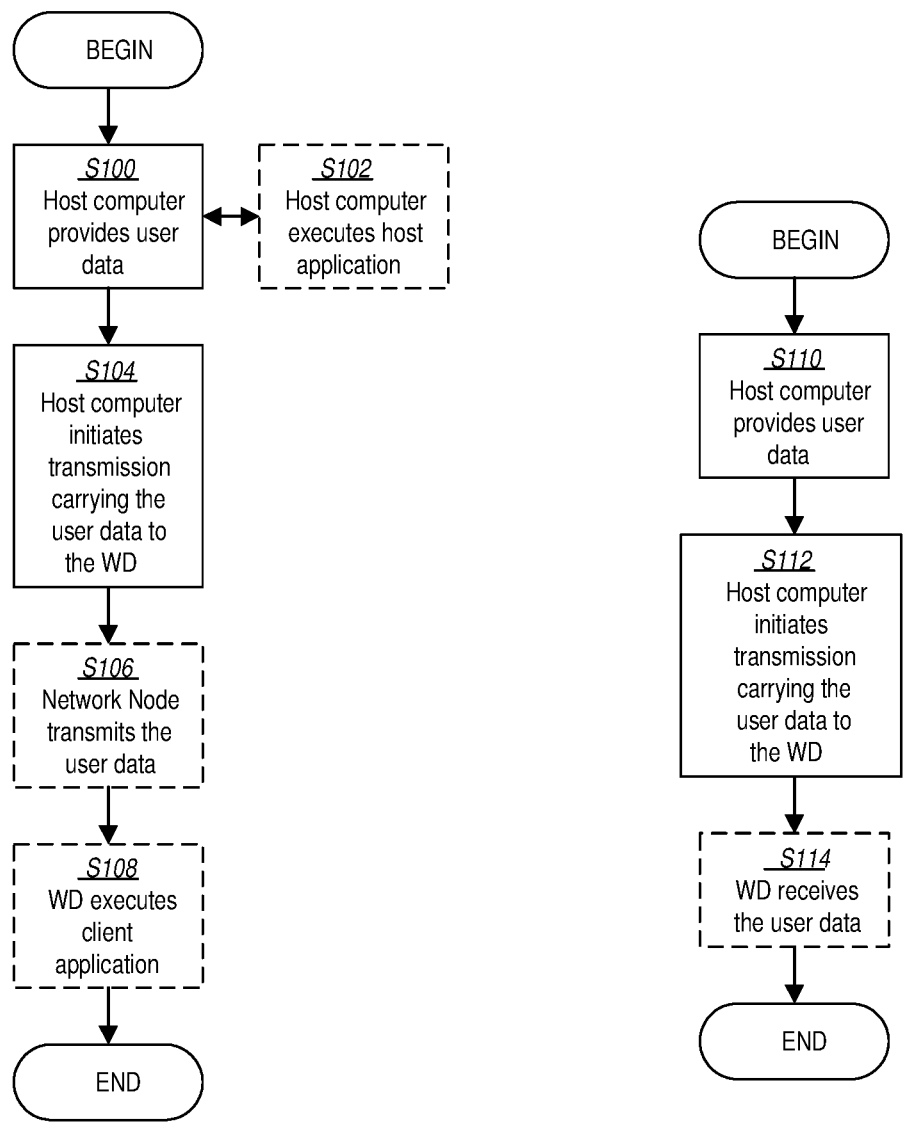

CONGESTION CONTROL IN AMF AND SMF

CROSS-REFERENCE TO RELATED APPLICATIONS

This application is a Submission Under 35 U.S.C. § 371 for U.S. National Stage Patent Application of International Application No.: PCT/IB2020/051274, filed Feb. 14, 2020, entitled "CONGESTION CONTROL IN AMF AND SMF," which claims priority to International Application No.: PCT/CN2019/075020, filed Feb. 14, 2019, the entireties of both of which are incorporated herein by reference.

TECHNICAL FIELD

The present disclosure relates to wireless communications, and in particular, to reporting Data Off status change.

BACKGROUND

Data Off Status Reporting When Congestion Control Applies

Data Off status reporting in cases of congestion control for a Data Network Name (DNN) is described in the following clauses of the Third Generation Partnership Project (3GPP) Technical Standard (TS) 23.501 v15.4.0, where WD denotes a user equipment (UE), also referred to herein as a wireless device (WD):

5.19.7.3 DNN Based Congestion Control

SMFs may apply DNN based congestion control towards the UE by rejecting PDU Session Establishment Request message, or PDU Session Modification Request message except for 3GPP PS Data Off status change reporting towards a specific DNN, from the UE, with a back-off timer and the associated DNN. The SMF may release PDU Sessions belonging to a congested DNN by sending a PDU Session Release Request message towards the UE with a back-off timer. If back-off timer is set in the PDU Session Release Request message then the cause "reactivation requested" should not be set.

Upon reception of the back-off timer for a DNN, the UE shall take the following actions until the timer expires:

The UE is allowed to initiate the Session Management procedure for reporting Data Off status change to the network even when the back-off timer is running; and 5.19.7.4 S-NSSAI Based Congestion Control S-NSSAI based congestion control is applied as follows:

Upon reception of a back-off timer with an associated S-NSSAI and optionally a DNN, the UE shall take the following actions:

The UE is allowed to initiate the Session Management procedure for reporting Data Off status change for the S-NSSAI or the combination of S-NSSAI and DNN even when the back-off timer associated to the S-NSSAI or the combination of S-NSSAI and DNN is running.

5.24 3GPP PS Data Off

The UE shall immediately report a change of its 3GPP PS Data Off status in PCO by using UE requested PDU Session Modification procedure. This also applies to the scenario of inter-RAT mobility to NG-RAN and to scenarios where the 3GPP PS Data Off status is changed when the session management back-off timer is running as specified in clause 5.19.7.3 and clause 5.19.7.4.

Note with reference to the above, S-NSSAI stands for "Single Network Slice Selection Assistance Information".

In SA2 #130, some clarifications were made in S2-1901389 that the Access and Mobility Function (AMF) shall not reject the Uplink (UL) Non-Access Stratum (NAS) TRANSPORT message carrying a Non Access Stratum (NAS) Session Management (SM) message for Data Off status change reporting and shall forward the carried NAS SM message to the Session Management Function (SMF).

Data Off Status Reporting for Packet Data Unit (PDU) Session of WD in Non-Allowed Area or not in Allowed Area Per 3$^{rd}$ Generation Partnership Project (3GPP) Technical Standard (TS) 23.501 v15.4.0, a wireless device (WD) (also referred to as a User Equipment (UE)) in a non-allowed area is not permitted to initiate a Service Request or SM signaling to obtain user services.

5.3.4.1 Mobility Restrictions 5.3.4.1.1 General

Mobility Restrictions consists of RAT restriction, Forbidden Area, Service Area Restrictions and Core Network type restriction as follows:

Service Area Restriction:

Defines areas in which the UE may or may not initiate communication with the network as follows:

Allowed Area:

In an Allowed Area, the UE is permitted to initiate communication with the network as allowed by the subscription.

Non-Allowed Area:

In a Non-Allowed Area a UE is service area restricted based on subscription. The UE and the network are not allowed to initiate Service Request or SM signalling to obtain user services (both in CM-IDLE and in CM-CONNECTED states). The UE shall not use the entering of a Non-Allowed Area as a criterion for Cell Reselection, a trigger for PLMN Selection or Domain selection for UE originating sessions or calls. The RRC procedures while the UE is in CM-CONNECTED with RRC Inactive state are unchanged compared to when the UE is in an Allowed Area. The RM procedures are unchanged compared to when the UE is in an Allowed Area. The UE in a Non-Allowed Area shall respond to core network paging or NAS Notification message from non-3GPP access with Service Request and RAN paging.

Data Off status reporting for a Packet Data Unit (PDU) Session of a WD moving out of a Local Access Data Network (LADN) area Per 3GPP TS 23.501 v15.4.0, a WD moving out of the LADN area should not modify a PDU Session for this LADN data network name (DNN):

5.6.5 Support for Local Area Data Network

Based on the LADN Service Area Information in the UE, the UE determines whether it is in or out of a LADN service area. If the UE does not have the LADN Service Area Information for a LADN DNN, the UE shall consider it is out of the LADN service area.

The UE takes actions as follows:

When the UE is out of a LADN service area, the UE:

shall not request to activate UP connection of a PDU Session for this LADN DNN;

shall not establish/modify a PDU Session for this LADN DNN;

need not release any existing PDU Session for this LADN DNN unless UE receives explicit SM PDU Session Release Request message from the network.

SUMMARY

There are several problems with these existing solutions:

Problem-1 There may be a misbehaving WD that indicates in an uplink (UL) NAS TRANSPORT message that the carried NAS SM message is not subject to congestion control even if the carried SM message is not for reporting of Data Off status change. This functionality is missing in 3GPP TS 23.501.

Problem-2 When a WD is in non-allowed area, or not in an allowed area, the WD is not allowed to send any message. In this case, if the Data Off status is changed in the WD, the WD behavior is not specified. This functionality is missing in 3GPP TS 23.501.

Problem-3 When a WD moves out of a LADN area, and the PDU Session is still maintained, if the Data Off status is changed in the WD, the WD behavior is not specified. This functionality is missing in 3GPP TS 23.501.

To address Problem-1, the Session Management Function (SMF) may ensure that only messages not subject to congestion control can be accepted when congestion control is activated (e.g., during congestion, only messages for Data Off status reporting can be accepted). The solution is outlined as follows:

When the WD indicates a message to be exempted from congestion control;

How the WD indicates a message to be exempted from congestion control; and

What is required for the SMF to validate the message indicating to-be-exempted is indeed to be exempted.

To address Problem-2 and Problem-3, the WD may choose one of the following:

Non Allowed Area (NAA)-LADN-Option-1: the WD delays the reporting of Data Off status change until the WD moves into allowed area (and then normal procedure applies to the reporting);

NAA-LADN-Option-2: the WD immediately reports Data Off status change, and the AMF accepts the SM message and forwards it to the SMF. The SMF shall ensure only message for Data Off status reporting is accepted (or other messages defined to be exempted); or For NAA-LADN-Option-2: the SMF may validate if the message from the WD is indeed for that purpose.

Some embodiments advantageously provide methods, network nodes, and wireless devices for reporting Data Off status change.

In accordance with one aspect of the disclosure, a network node is provided that may be configured to communicate with a wireless device (WD), the network node being configured to, and/or comprising a radio interface and/or comprising processing circuitry configured to, when the WD changes a Data Off status when the WD is in a non-allowed area, then accept and forward a session management message from the WD to a session management function, the session management message indicating that congestion control is activated.

According to one aspect of the disclosure, an Access and Mobility Management Function, AMF, node implementing at least one congestion control process is provided. The AMF node includes processing circuitry configured to: receive a message including a first indication that the message is exempt from the at least one congestion control process, and forward the message with a second indication that indicates the message was received with the first indication.

According to one or more embodiments of this aspect, the first indication is provided by an absence of a request type in the message. According to one or more embodiments of this aspect, the first indication is provided by a predefined request type included in the message. According to one or more embodiments of this aspect, the second indication further indicates that at least one congestion control process at the AMF is active. According to one or more embodiments of this aspect, the message is forwarded to a Session Management Function, SMF, for validation as to whether the message is exempt from the at least one congestion control process. According to one or more embodiments of this aspect, the processing circuitry is further configured to: receive a third indication that the message has been accepted for exemption from the at least one congestion control process, and transmit a fourth indication to the wireless device indicating that the message has been accepted for exemption from the at least one congestions control process.

According to one or more embodiments, a method implemented in an Access and Mobility Management Function, AMF, node that implements at least one congestion control process is provided. A message including a first indication that the message is exempt from the at least one congestion control process is received. The message with a second indication that indicates the message was received with the first indication is forwarded.

According to one or more embodiments of this aspect, the first indication is provided by an absence of a request type in the message. According to one or more embodiments of this aspect, the first indication is provided by a predefined request type included in the message. According to one or more embodiments of this aspect, the second indication further indicates that at least one congestion control process at the AMF is active. According to one or more embodiments of this aspect, the message is forwarded to a Session Management Function, SMF, for validation as to whether the message is exempt from the at least one congestion control process. According to one or more embodiments of this aspect, a third indication that the message has been accepted for exemption from the at least one congestion control process is received. A fourth indication to the wireless device indicating that the message has been accepted for exemption from the at least one congestions control process is transmitted.

According to another aspect of the disclosure, a Session Management Function, SMF, node is provided. The SMF node includes processing circuitry configured to: receive: a message including a second indication indicating that the message was received with a first indication indicating that the message is exempt from at least one congestion control process; and determine whether the message is exempt from the at least one congestion control process; and notify an application management function of the determination.

According to one or more embodiments of this aspect, the first indication is provided by an absence of a request type in the message. According to one or more embodiments of this aspect, the first indication is provided by a predefined request type included in the message. According to one or more embodiments of this aspect, the second indication further indicates that at least one congestion control process at the AMF is active.

According to another aspect of the disclosure, a method implemented in a session management function, SMF, node is provided. A message including a second indication indicating that the message was received with the first indication is received first indication indicating that the message is exempt from the at least one congestion control process is received. A. A determination is made whether the message is exempt from the at least one congestion control process. An application management function is notified of the determination.

According to one or more embodiments of this aspect, the first indication is provided by an absence of a request type in the message. According to one or more embodiments of this aspect, the first indication is provided by a predefined request type included in the message. According to one or more embodiments of this aspect, the second indication further indicates that at least one congestion control process at the AMF is active.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
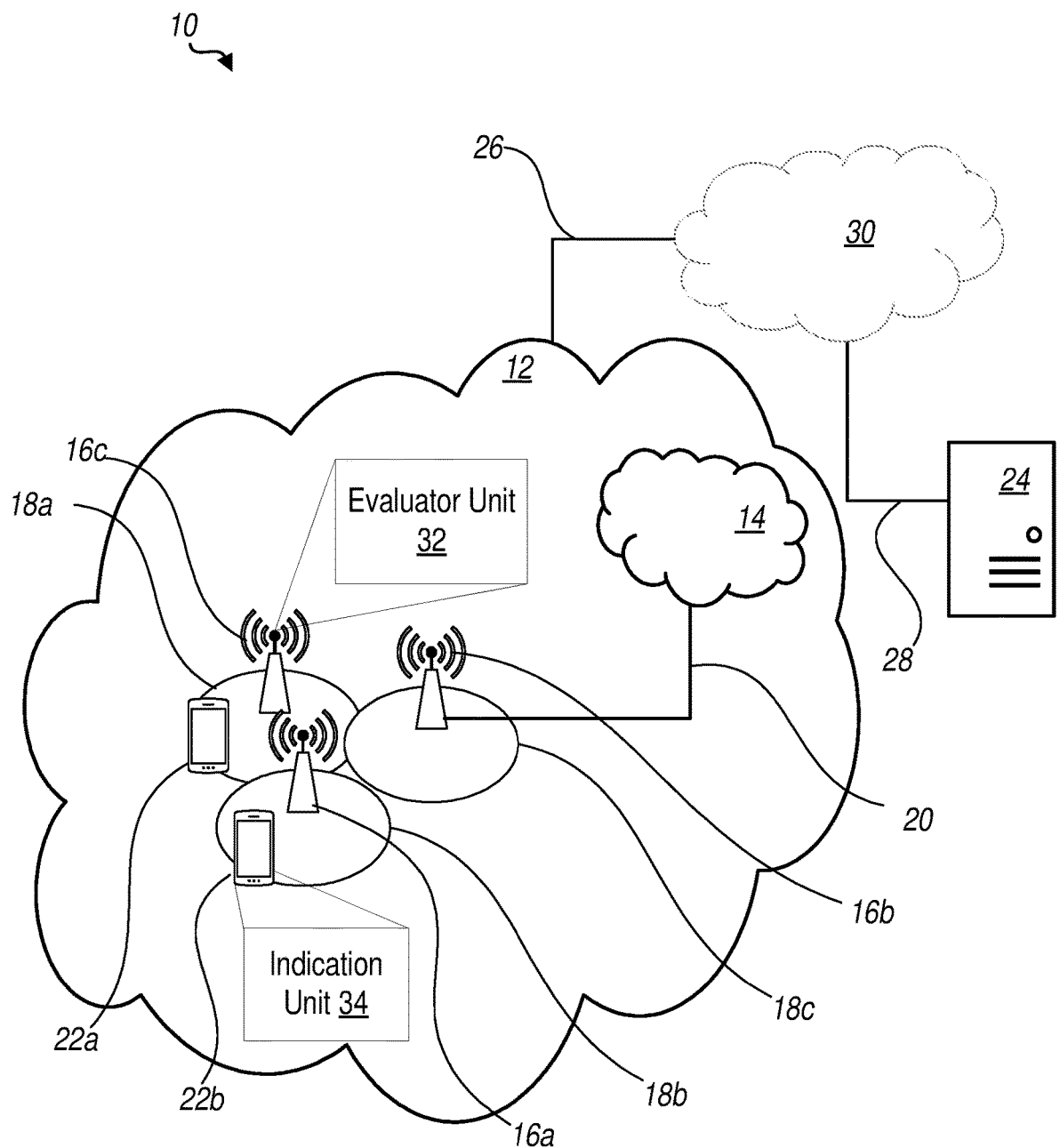
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to reporting Data Off status change. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, integrated access and backhaul (IAB) node, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, IAB node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for reporting Data Off status change. In some embodiments, a network node accepts and forwards a session management message from the WD to a session management function, the session management message indicating that congestion control is activated. In some embodiments, a WD is configured to indicate that a message for reporting a Data Off status change is exempted from congestion control. The indicating occurs when congestion control is activated.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include an evaluator unit 32 which is configured to accept and forward a session management message from the WD to a session management function, the session management message indicating that congestion control is activated. The accepting and forwarding occurs when the WD changes a Data Off status. A wireless device 22 is configured to include an indicator unit 34 which is configured to indicate that a message for reporting a Data Off status change is exempted from congestion control. The indicating occurs when congestion control is activated. In one or more embodiments, the network node 16 may include, i.e., implement, an access and mobility management function (AMF) node 16 and/or a session management function (SMF) node 16. Thus, discussions herein regarding the capability of network node 16 should be understood as including one or both of the AMF and SMF. For ease of discussion and understanding, network nodes 16 that serve as AMF nodes may be referred to as AMF nodes 16, and network nodes 16 that serve as SMF nodes may be referred to as SMF nodes 16.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include the evaluator unit 32 configured to accept and forward a session management message from the WD to a session management function, the session management message indicating that congestion control is activated. The accepting and forwarding occurs when the WD changes a Data Off status when the WD is in a non-allowed area.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include the indicator unit which is configured to indicate that a message for reporting a Data Off status change is exempted from congestion control. The indicating may occur when congestion control is activated.

Figure 2:
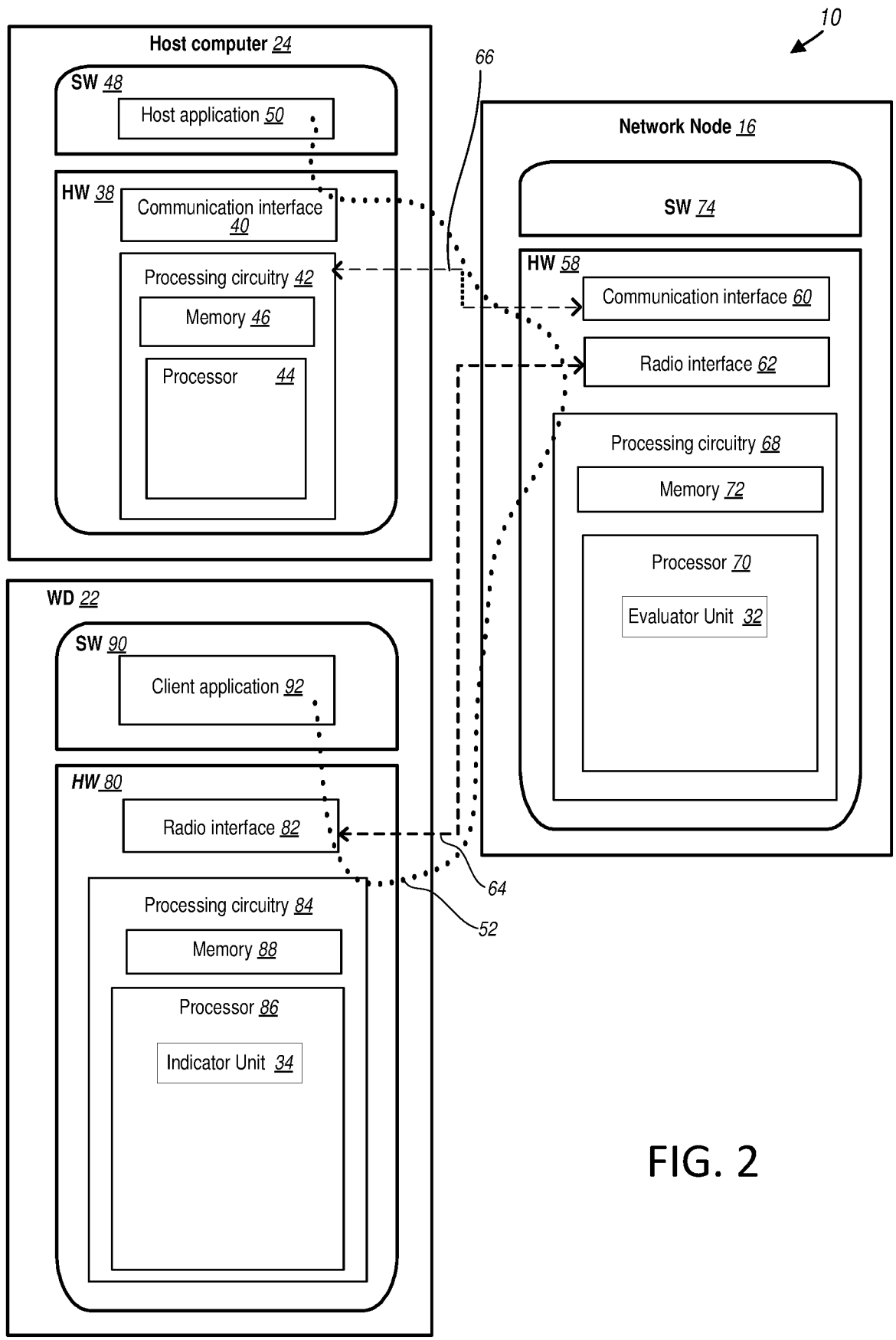
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as evaluator unit 32 and indicator unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 114, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
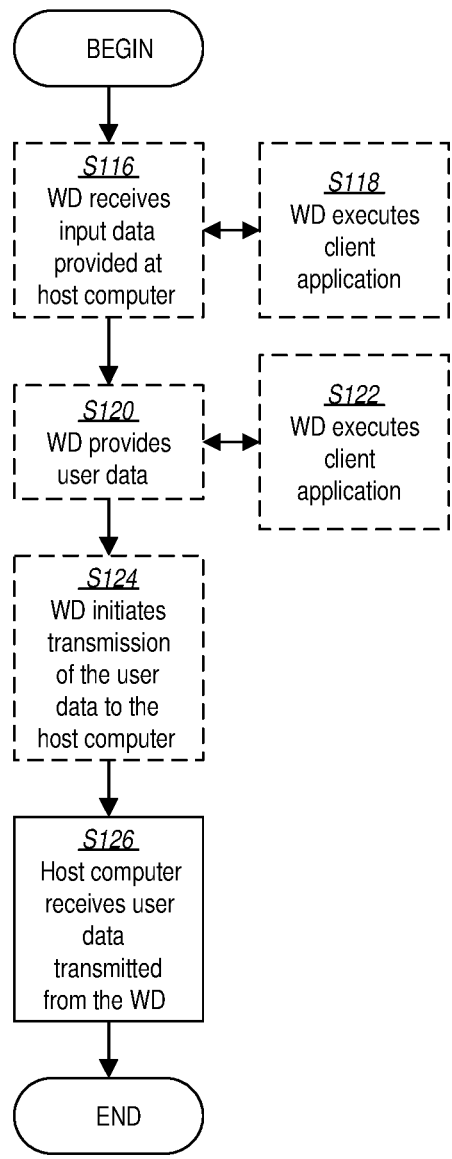
FIG. 5 is a flowchart illustrating exemplary methods implemented in a communication system including a host computer, a network node and a wireless device for receiving user data from the wireless device at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 114, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 114 (Block S122). In providing the user data, the executed client application 114 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
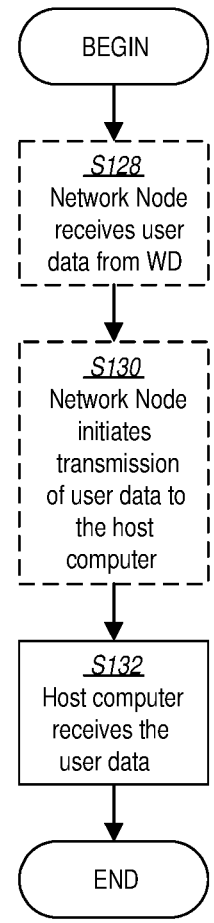
FIG. 6 is a flowchart illustrating exemplary methods implemented in a communication system including a host computer, a network node and a wireless device for receiving user data at a host computer according to some embodiments of the present disclosure.

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
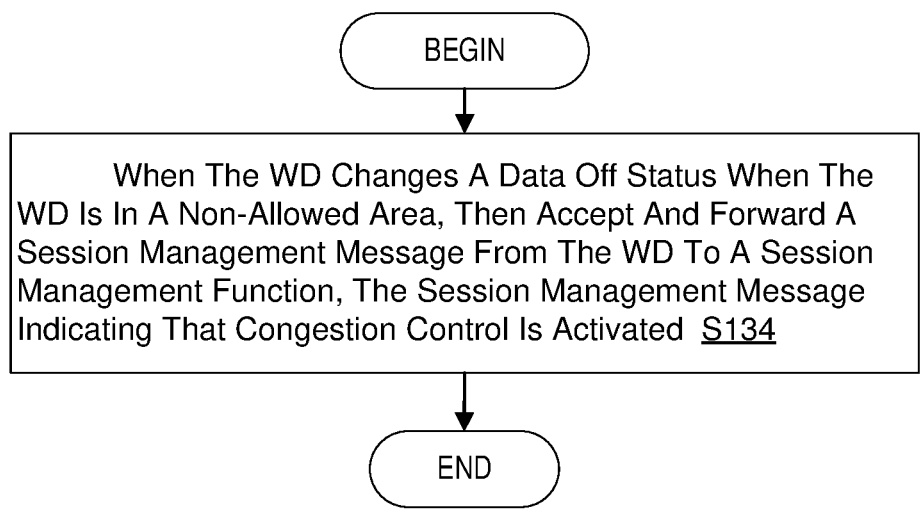
FIG. 7 is a flowchart of an exemplary process in a network node for receiving the reporting of Data Off status change according to some embodiments of the present disclosure.

FIG. 7 is a flowchart of an exemplary process in a network node 16 for receiving reporting of Data Off status change according to some embodiments of the present disclosure. One or more blocks described herein may be performed by one or more elements of network node 16 such as by one or more of processing circuitry 68 (including the evaluator unit 32), processor 70, radio interface 62 and/or communication interface 60. Network node 16 such as via processing circuitry 68 and/or processor 70 and/or radio interface 62 and/or communication interface 60 is configured to accept and forward a session management message from the WD to a session management function, the session management message indicating that congestion control is activated, wherein the accepting and forwarding occurs when the WD changes a Data Off status (Block S134).

Figure 8:
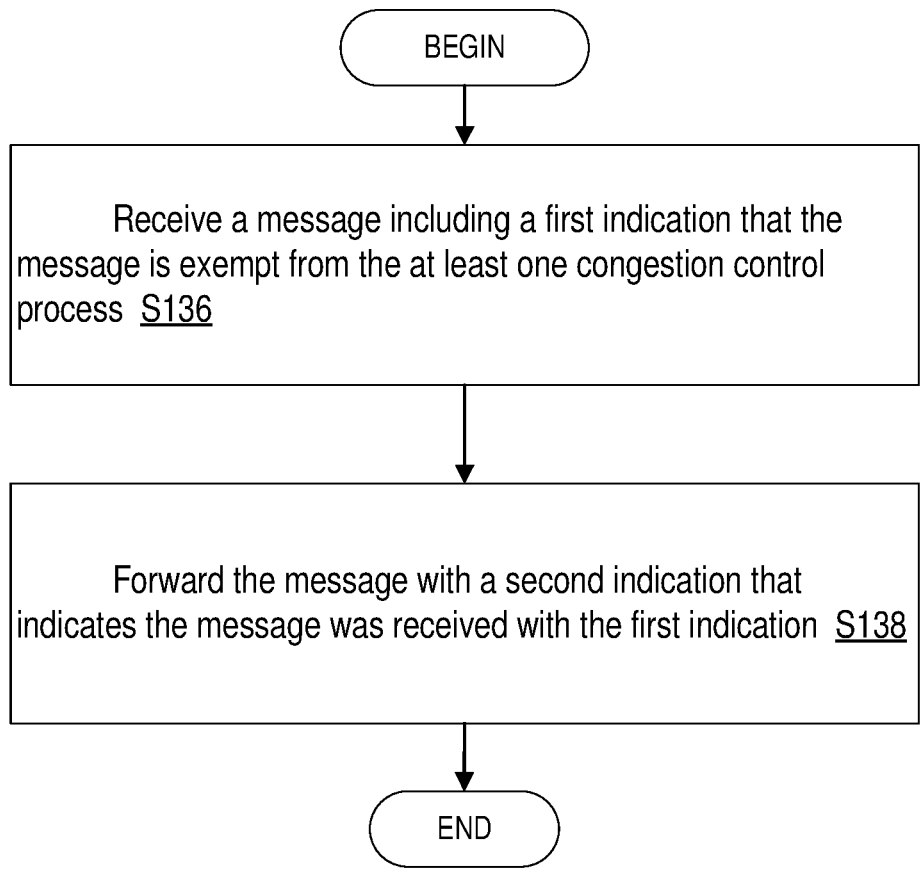
FIG. 8 is a flowchart of another exemplary process in a network node according to some embodiments of the present disclosure.

FIG. 8 is a flowchart of an exemplary process in a network node 16 according to some embodiments of the present disclosure. In one or more embodiments, network node 16 is an Access and Mobility Management Function (AMF) or implements the functionality of an AMF. One or more blocks described herein may be performed by one or more elements of network node 16 such as by one or more of processing circuitry 68 (including the evaluator unit 32), processor 70, radio interface 62 and/or communication interface 60. Network node 16 such as via processing circuitry 68 and/or processor 70 and/or radio interface 62 and/or communication interface 60 is configured to receive a message including a first indication that the message is exempt from the at least one congestion control process, as described herein (Block S136). Network node 16 such as via processing circuitry 68 and/or processor 70 and/or radio interface 62 and/or communication interface 60 is configured to forward the message with a second indication that indicates the message was received with the first indication, as described herein (Block S138).

According to one or more embodiments, the first indication is provided by an absence of a request type in the message. According to one or more embodiments, the first indication is provided by a predefined request type included in the message. According to one or more embodiments, the second indication further indicates that at least one congestion control process at the AMF is active.

According to one or more embodiments, the message is forwarded to a SMF for validation as to whether the message is exempt from the at least one congestion control process. According to one or more embodiments, the processing circuitry is further configured to: receive a third indication that the message has been accepted for exemption from the at least one congestion control process; and transmit a fourth indication to wireless device indicating that the message has been accepted for exemption from the at least one congestions control process.

Figure 9:
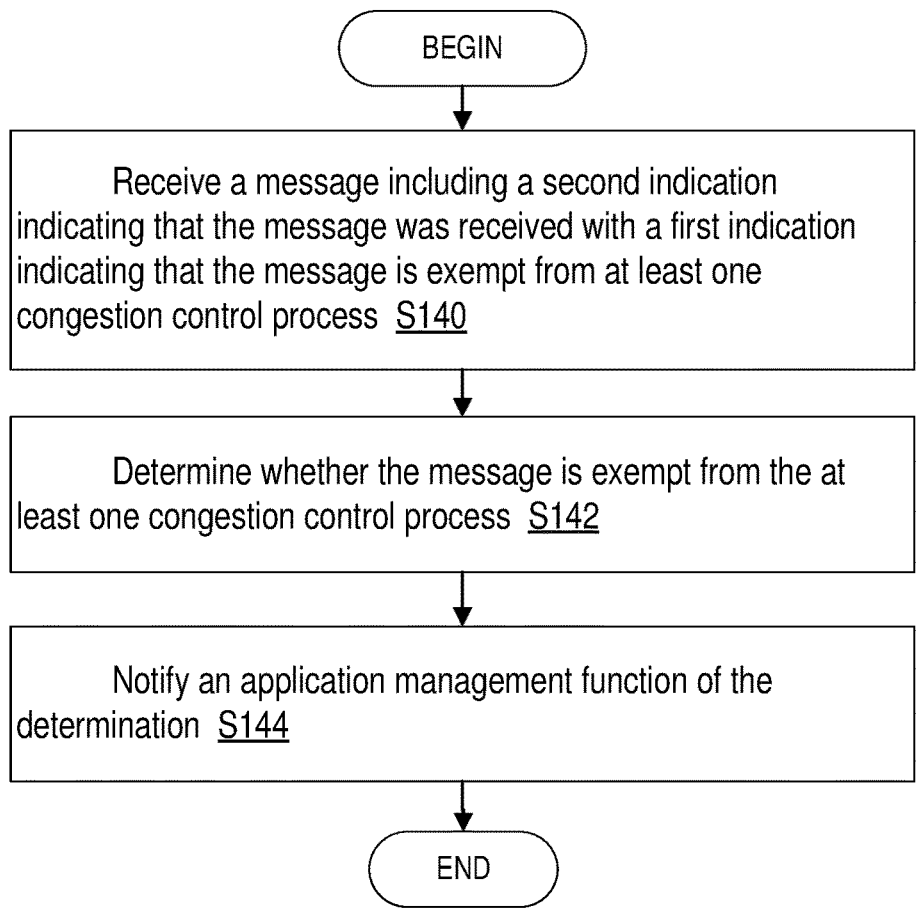
FIG. 9 is a flowchart of another exemplary process in a network node according to some embodiments of the present disclosure.

FIG. 9 is a flowchart of an exemplary process in a network node 16 according to some embodiments of the present disclosure. In one or more embodiments, network node 16 is a session management function (SMF) or implements the functionality of an SMF. One or more blocks described herein may be performed by one or more elements of network node 16 such as by one or more of processing circuitry 68 (including the evaluator unit 32), processor 70, radio interface 62 and/or communication interface 60. Network node 16 such as via processing circuitry 68 and/or processor 70 and/or radio interface 62 and/or communication interface 60 is configured to receive a message including a second indication indicating that the message was received with a first indication indicating that the message is exempt from at least one congestion control process, as described herein (Block S140). Network node 16 such as via processing circuitry 68 and/or processor 70 and/or radio interface 62 and/or communication interface 60 is configured to determine whether the message is exempt from the at least one congestion control process (Block S142). Network node 16 such as via processing circuitry 68 and/or processor 70 and/or radio interface 62 and/or communication interface 60 is configured to notify an Access and Mobility Management Function (AMF) of the determination, as described herein (Block S144).

According to one or more embodiments, the first indication is provided by an absence of a request type in the message. According to one or more embodiments, the first indication is provided by a predefined request type included in the message. According to one or more embodiments, the second indication further indicates that at least one congestion control process at the AMF is active.

Figure 10:
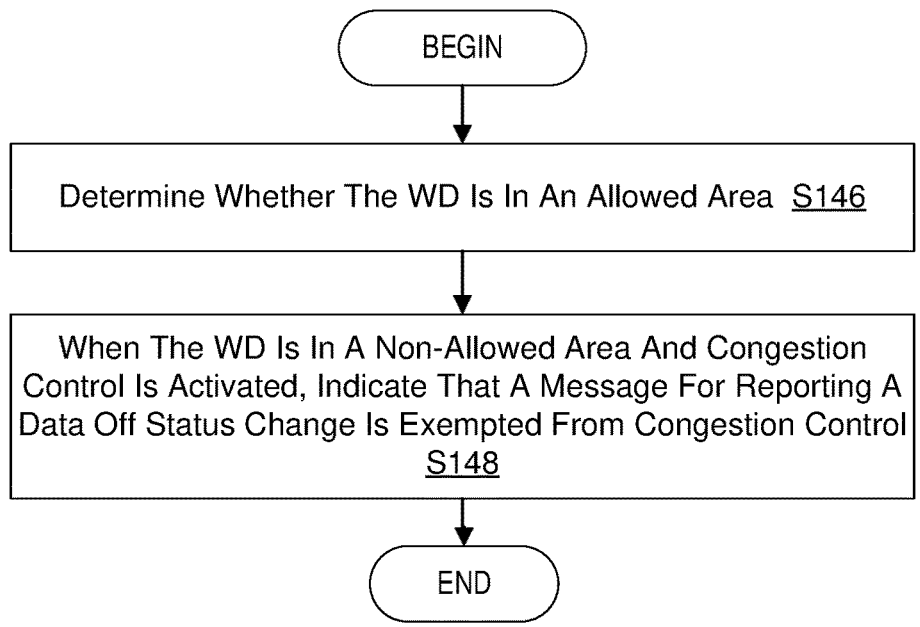
FIG. 10 is a flowchart of an exemplary process in a wireless device for reporting Data Off status change according to some embodiments of the present disclosure.

FIG. 10 is a flowchart of an exemplary process in a wireless device 22 for reporting Data Off status change according to some embodiments of the present disclosure. One or more blocks described herein may be performed by one or more elements of wireless device 22 such as by one or more of processing circuitry 84 (including the indicator unit 34), processor 86, radio interface 82 and/or communication interface 60. Wireless device 22 such as via processing circuitry 84 and/or processor 86 and/or radio interface 82 is configured to determine whether the WD is in an allowed area (Block S146). The process also includes, when the WD is in a non-allowed area and congestion control is activated, indicating that a message for reporting a Data Off status change is exempted from congestion control (Block S148).

Having described the general process flow of arrangements of the disclosure and having provided examples of hardware and software arrangements for implementing the processes and functions of the disclosure, the sections below provide details and examples of arrangements for reporting Data Off status change.

Example Solution to avoid misbehaving WD 22 indicating message to be exempted from congestion control which should not be exempted.

Figure 11:
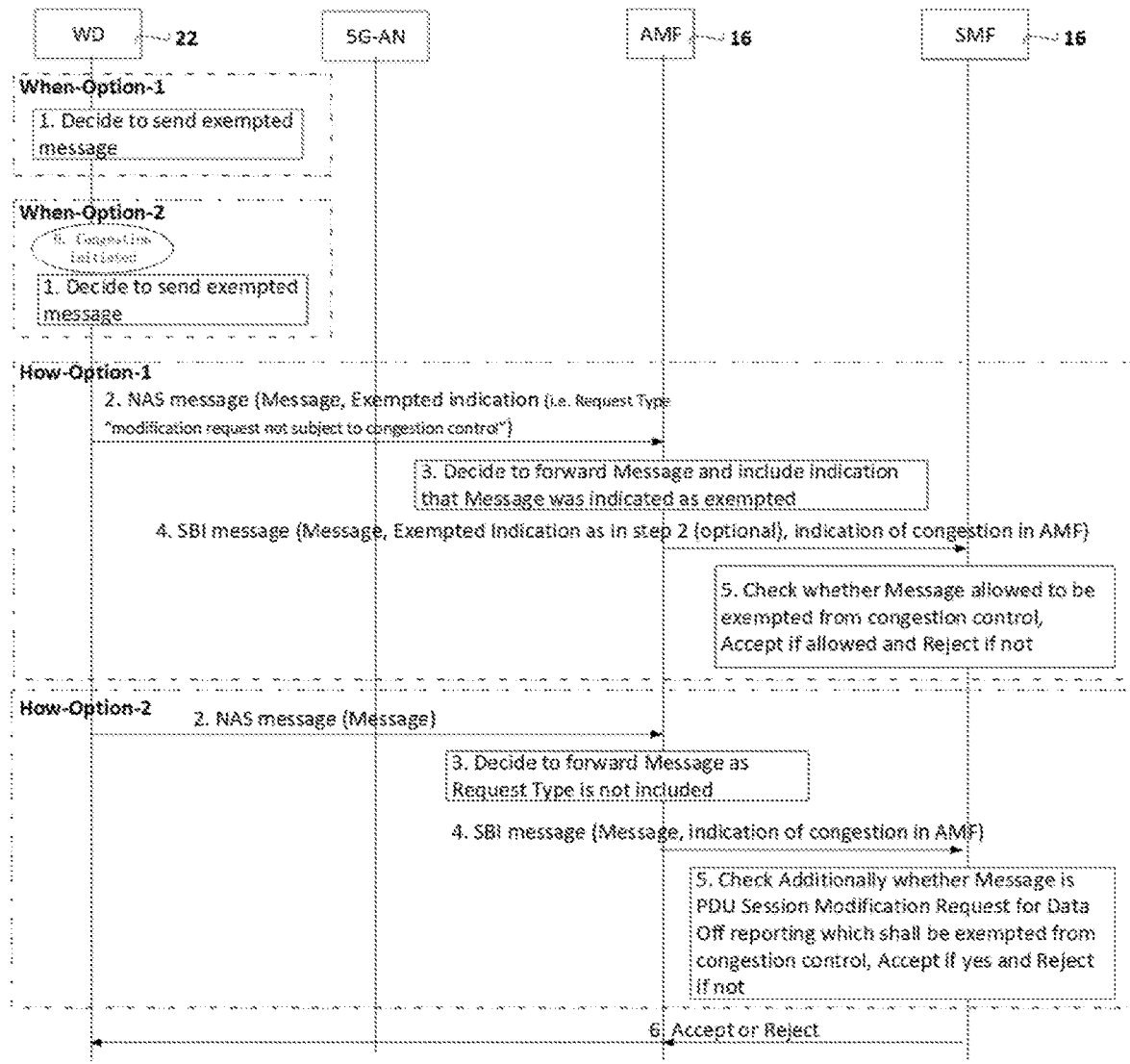
FIG. 11 is a diagram of a first embodiment for reporting of Data Off status change.

A solution which addresses Problem-1 mentioned above is illustrated in FIG. 11 and described below, which includes the following aspects:

When the WD 22 indicates a message to be exempted from congestion control (When-Option-1 and When-Option-2;

How the WD 22 indicates a message to be exempted from congestion control (How-Option-1 and When-Option-2; and What is required for the SMF to validate the message indicating to-be-exempted is indeed to be exempted.

When the WD 22 indicates a message to be exempted from congestion control

The WD 22 may choose, via the processor 86, one of the following options:

When-Option-1: Regardless of whether congestion control is activated (i.e., whether a back off timer is running or not in the WD 22), the WD 22 always indicates, via the indictor unit 34, that the message for reporting Data Off status change is exempted from congestion control; or When-Option 2: The WD 22 indicates that the message is to be exempted from congestion control only when congestion control is enabled, e.g., when the AMF, via the evaluator unit 32, activates the back off timer. In other words, when the previous NAS message has been rejected or when other ways to apply congestion control is enabled in the fifth generation system (5GS), e.g., using Unified Access Control (UAC).

How the WD 22 indicates a message to be exempted from congestion control

The WD 22 may choose, via the processor 86, one of the following to indicate that a message is to be exempted from congestion control:

How-Option-1: the WD 22 uses a new request type to indicate that the message is exempted from congestion control. The new request type could use one of the following definitions:

"modification request not subject to congestion control"; or

"prioritized modification request" which is more generic; or

"modification request for reporting Data Off status change"

How-Option-2: the WD 22 does not include any request type, which is the same as for the messages (e.g., PDU Session Release) that are always to be exempted.

What is required for the SMF to validate the message indicating to-be-exempted is indeed eligible for exemption To prevent misbehaving WD 22s from indicating, via the indicator unit 34, a message to be exempted from congestion control, which message is in fact not eligible for exemption, the SMF may validate, via the evaluator unit 32, the message received from the AMF.

Depending on which How-Option is adopted, the SMF validates the message as follows:

If How-Option-1 is used:

When the AMF receives a Message with Request Type "modification request not subject to congestion control" (or "prioritized modification request", or "modification request for reporting Data Off status change"), the AMF may inform the SMF that congestion control is activated in the AMF (or SMF knows from operations and management (O&M)), so that the SMF is able to validate that the Messages tagged with the new Request Type are indeed eligible for being exempted. In other words, if congestion control applies in the AMF and/or in the SMF, but the message tagged with the new Request type is not for reporting Data Off status change, the SMF shall reject the message with proper cause.

If How-Option-2 is used:

In this option, the WD 22 does not indicate, via the indicator unit 34, any Request Type and as a result, the AMF, via the evaluator unit 32, is not able to differentiate if the Message is for Data Off status reporting or for other purposes. Therefore, the AMF may always indicate, via the evaluator unit 32, whether congestion control applies to the SMF so that the SMF can validate if the carried SM message is a PDU Session Modification Request and if the carried SM message is for Data Off reporting which can be exempted from congestion control. If congestion control applies, and the PDU Session Modification Request is not for Data Off reporting, the SMF rejects such message with proper cause.

Figure 12:
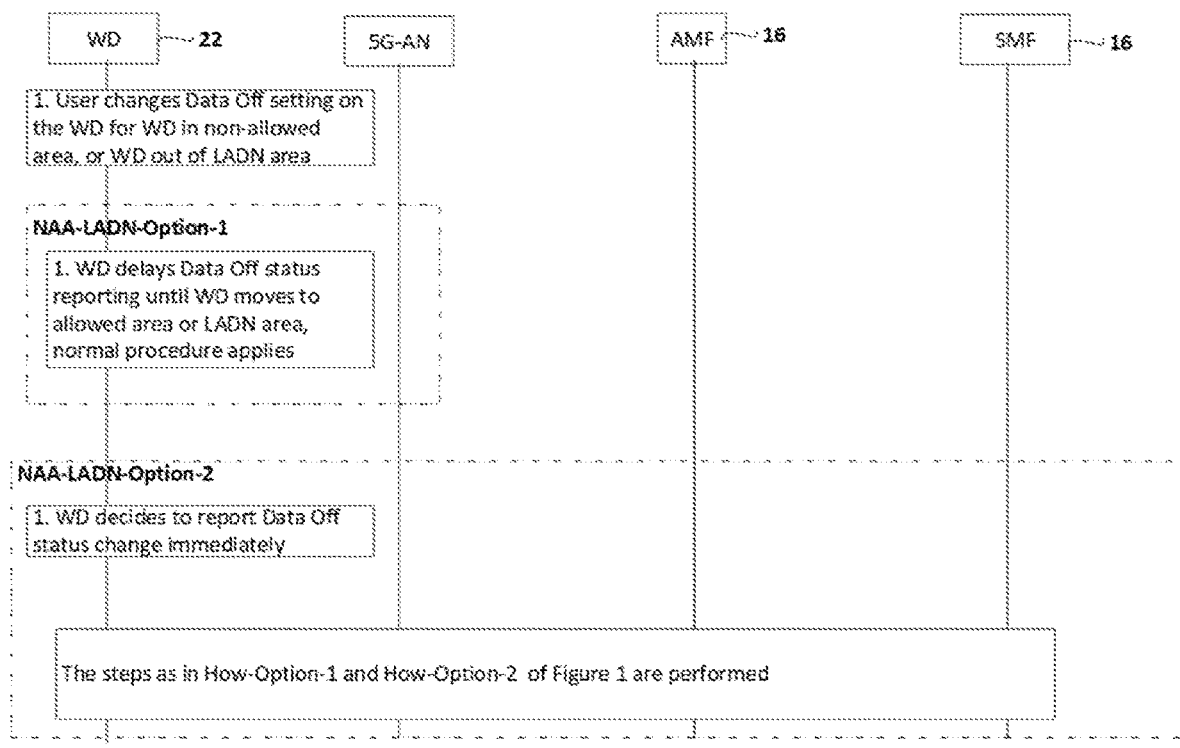
FIG. 12 is a diagram of a second embodiment for reporting of Data Off status change.

Solution to avoid AMF rejecting message for reporting of Data Off status change for WDs 22 in non-allowed area or WDs 22 out of LADN area Solutions which address Problem-2 and Problem-3 mentioned above are illustrated in FIG. 12.

If the user changes the Data Off status when the WD 22 is in a non-allowed area, or the WDs 22 are moving out of the LADN area but the PDU Session is still maintained, the WD 22 may choose, via the processor 86, either of the two following options:

NAA-LADN-Option-1: the WD 22 delays the reporting of Data Off status change until the WD 22 moves into the allowed area, or the WD 22 moves into the LADN area; or NAA-LADN-Option-2: the WD 22 immediately reports Data Off status change, and the AMF accepts the SM message and forwards the SM message to the SMF. The SMF may ensure that only message for Data Off status reporting is accepted (or other messages defined to be exempted).

Thus, according to one aspect, a network node 16 has processing circuitry configured to: when the WD 22 changes a Data Off status, then accept and forward a session management message from the WD 22 to a session management function, the session management message indicating that congestion control is activated.

According to this aspect, in some embodiments, the session management function validates the session management message. In some embodiments, if congestion control is applied but the session management message is not for reporting Data Off status change, the session management function rejects the session management message.

According to another aspect, a wireless device 22 has processing circuitry configured to: determine whether the WD 22 is in an allowed area, and when the WD 22 is in a non-allowed area and congestion control is activated, indicate that a message for reporting a Data Off status change is exempted from congestion control.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| AMF | Access and Mobility Management Function |
| LADN | Local Access Data Network |
| NAS | Non-Access Stratum |
| RAN | Radio Access Network |
| RAT | Radio Access Technology |
| SMF | Session Management Function |
| PCO | Protocol Configuration Option |
| PDU | Packet Data Unit |

The following are examples of changes to standards-based embodiments that may be made in support of the disclosures made herein. As one example, changes may be considered to 3GPP TS23.501 v15.4.0. The section references below refer to those sections of 3GPP TS23.501 v15.4.0 that may be changed.
5.3.4.1 Mobility Restrictions
5.3.4.1.1 General
Mobility Restrictions restrict mobility handling or service access of a UE. The Mobility Restriction functionality is provided by the UE (only for mobility restriction categories provided to the UE), the radio access network and the core network. Mobility Restrictions only apply to 3GPP access, they do not apply to non-3GPP access.
Service Area restrictions and handling of Forbidden Areas for CM-IDLE state and, for CM-CONNECTED state when in RRC Inactive state are executed by the UE based on information received from the core network. Mobility Restrictions for CM-CONNECTED state when in RRC-Connected state are executed by the radio access network and the core network.
In CM-CONNECTED state, the core network provides Mobility Restrictions to the radio access network within Mobility Restriction List.
Mobility Restrictions consists of RAT restriction, Forbidden Area, Service Area Restrictions and Core Network type restriction as follows:
RAT restriction:
Defines the 3GPP Radio Access Technology(ies), a UE is not allowed to access in a PLMN. In a restricted RAT a UE based on subscription is not permitted access to the network for this PLMN. For CM-CONNECTED state, when radio access network determines target RAT and target PLMN during Handover procedure, it should take per PLMN RAT restriction into consideration. The RAT restriction is enforced in the network, and not provided to the UE.
Forbidden Area:
In a Forbidden Area, the UE, based on subscription, is not permitted to initiate any communication with the network for this PLMN. The UE behaviour in terms of cell selection, RAT selection and PLMN selection depends on the network response that informs the UE of Forbidden Area.
NOTE 1: The UE reactions to specific network responses are described in TS 24.501 [47].
Service Area Restriction:
Defines areas in which the UE may or may not initiate communication with the network as follows:
Allowed Area:
In an Allowed Area, the UE is permitted to initiate communication with the network as allowed by the subscription.
Non-Allowed Area:
In a Non-Allowed Area a UE is service area restricted based on subscription. The UE and the network are not allowed to initiate Service Request or SM signalling except for Data Off status reporting to obtain user services (both in CM-IDLE and in CM-CONNECTED states). The UE shall not use the entering of a Non-Allowed Area as a criterion for Cell Reselection, a trigger for PLMN Selection or Domain selection for UE originating sessions or calls. The RRC procedures while the UE is in CM-CONNECTED with RRC Inactive state are unchanged compared to when the UE is in an Allowed Area. The RM procedures are unchanged compared to when the UE is in an Allowed Area. The UE in a Non-Allowed Area shall respond to core network paging or NAS Notification message from non-3GPP access with Service Request and RAN paging.
NOTE 2: When the services are restricted in 5GS due to Service Area Restriction, then it is assumed that the services will be also restricted in all RATs/Systems at the same location(s) using appropriate mechanisms available in the other RATs/Systems.
Core Network type restriction:
Defines whether UE is allowed to connect to 5GC for this PLMN.
NOTE 3: The Core Network type restriction can be used e.g. in network deployments where the E-UTRAN connects to both EPC and 5GC as described in clause 5.17.
For a given UE, the core network determines the Mobility Restrictions based on UE subscription information, UE location and local policy. The Mobility Restriction may change due to e.g. UE's subscription, location change and local policy. Optionally the Service Area Restrictions or the Non-Allowed Area may in addition be fine-tuned by the PCF e.g. based on UE location, PEI and network policies. Service Area Restrictions may be updated during a Registration procedure or UE Configuration Update procedure.
NOTE 4: The subscription management ensure that for MPS service subscriber the Mobility Restrictions is not included.
If the network sends Service Area Restrictions to the UE, the network sends only either an Allowed Area, or a Non-Allowed Area, but not both at the same time, to the UE. If the UE has received an Allowed Area from the network, any TA not part of the Allowed Area is considered by the UE as non-allowed. If the UE has received a Non-Allowed Area from the network, any TA not part of the Non-Allowed Area is considered by the UE as allowed. If the UE has not received any Service Area Restrictions, any TA in the PLMN is considered as allowed.
If the UE has overlapping areas between Forbidden Areas, Service Area Restrictions, or any combination of them, the UE shall proceed in the following precedence order: The evaluation of Forbidden Areas shall take precedence over the evaluation of Service Area Restrictions.
The UE and the network shall override any Forbidden Area, Non-Allowed area restrictions and Core Network type restriction whenever access to the network for regulatory prioritized services like Emergency services and MPS.
5.6.5 Support for Local Area Data Network
The access to a DN via a PDU Session for a LADN is only available in a specific LADN service area. A LADN service area is a set of Tracking Areas. LADN is a service provided by the serving PLMN. It includes: LADN service applies only to 3GPP accesses and does not apply in Home Routed case.
The usage of LADN DNN requires an explicit subscription to this DNN or subscription to a wildcard DNN.
Whether a DNN corresponds to a LADN service is an attribute of a DNN.

The UE is configured to know whether a DNN is a LADN DNN and an association between application and LADN DNN. The configured association is considered to be a UE local configuration defined in TS 23.503 [45]. Alternatively, the UE gets the information whether a DNN is a LADN DNN from LADN Information during (re-)registration procedure as described in this clause.

NOTE 1: No other procedure for configuring the UE to know whether a DNN is a LADN DNN is defined in this release of the specifications.

NOTE 2: The procedure for configuring the UE to know an association between application and LADN DNN is not defined in this release of the specifications.

LADN service area and LADN DNN are configured in the AMF on a per DN basis, i.e. for different UEs accessing the same LADN, the configured LADN service area is the same regardless of other factors (e.g. UE's Registration Area or UE subscription).

NOTE 3: If a LADN is not available in any TA of an AMF's service area, the AMF is not required to be configured with any LADN related information for that DNN.

LADN Information (i.e. LADN Service Area Information and LADN DNN) is provided by AMF to the UE during the Registration procedure or UE Configuration Update procedure. For each LADN DNN configured in the AMF, the corresponding LADN Service Area Information includes a set of Tracking Areas that belong to the Registration Area that the AMF assigns to the UE (i.e. the intersection of the LADN service area and the assigned Registration Area). The AMF shall not create Registration Area based on the availability of LADNs.

NOTE 4: It is thus possible that the LADN Service Area Information sent by the AMF to the UE contains only a sub-set of the full LADN service area as the LADN service area can contain TA(s) outside of the registration area of the UE or outside of the area served by the AMF.

When the UE performs a successful (re-)registration procedure, the AMF may provide to the UE, based on local configuration (e.g. via OAM) about LADN, on UE location, and on UE subscription information received from the UDM about subscribed DNN(s), the LADN Information for the list of LADN available to the UE in that Registration Area in the Registration Accept message. The list of LADN is determined as follows:

If neither LADN DNN nor an indication of requesting LADN Information is provided in the Registration Request message, the list of LADN is the LADN DNN(s) in subscribed DNN list except for wildcard DNN.

If the UE provides LADN DNN(s) in the Registration Request message, the list of LADN is LADN DNN(s) the UE requested if the UE subscribed DNN(s) includes the requested LADN DNN or if a wildcard DNN is included in the UE's subscription data.

NOTE 5: It is assumed that an application can use only one LADN DNN at a time.

If the UE provides an indication of requesting LADN Information in the Registration Request message, the list of LADN is all the LADN DNN(s) configured in the AMF if the wildcard DNN is subscribed, or the LADN DNN(s) which is in subscribed DNN list and no wildcard DNN is subscribed.

The UE may provide either the LADN DNN(s) to retrieve the LADN Information for the indicated LADN DNN(s) or an indication of Requesting LADN Information to retrieve the LADN Information for all LADN(s) available in the current Registration Area.

During the subsequent Registration procedure, if the network does not provide LADN Information for a DNN, the UE deletes any LADN Information for that DNN.

When the LADN Information for the UE in the 5GC is changed, the AMF shall update LADN Information to the UE through UE Configuration Update/Registration procedure as described in clause 4.2.4/4.2.2.2.2 in TS 23.502 [3].

When receiving PDU Session Establishment with LADN DNN or Service Request for the established PDU Session corresponding to LADN, the AMF determines UE presence in LADN service area and forwards it to the SMF if the requested DNN is configured at the AMF as a LADN DNN. Based on the LADN Service Area Information in the UE, the UE determines whether it is in or out of a LADN service area. If the UE does not have the LADN Service Area Information for a LADN DNN, the UE shall consider it is out of the LADN service area.

The UE takes actions as follows:
a) When the UE is out of a LADN service area, the UE:
   shall not request to activate UP connection of a PDU Session for this LADN DNN;
   shall not establish/modify a PDU Session for this LADN DNN except for Data Off status reporting;
   need not release any existing PDU Session for this LADN DNN unless UE receives explicit SM PDU Session Release Request message from the network.
b) When the UE is in a LADN service area, the UE:
   may request a PDU Session Establishment/Modification for this LADN DNN;
   may request to activate UP connection of the existing PDU Session for this LADN DNN.

The SMF supporting a DNN is configured with information about whether this DNN is a LADN DNN or not.

When receiving SM request corresponding an LADN from the AMF, the SMF determines whether the UE is inside LADN service area based on the indication (i.e. UE Presence in LADN service area) received from the AMF. If the SMF does not receive the indication, the SMF considers that the UE is outside of the LADN service area. The SMF shall reject the request if the UE is outside of the LADN service area. When the SMF receives a request for PDU Session Establishment with the LADN DNN, it shall subscribe to "UE mobility event notification" for reporting UE presence in Area of Interest by providing LADN DNN to the AMF as described in clauses 5.6.11 and 5.3.4.4.

Based on the notification about the UE presence in LADN service area notified by AMF (i.e. IN, OUT, or UNKNOWN), the SMF takes actions as follows based on operator's policy:
a) When SMF is informed that the UE presence in a LADN service area is OUT, the SMF shall:
   release the PDU Session immediately; or
   deactivate the user plane connection for the PDU Session with maintaining the PDU Session and ensure the Data Notification is disabled and the SMF may release the PDU Session if the SMF is not informed that the UE moves into the LADN service area after a period.
b) When SMF is informed that the UE presence a LADN service area is IN, the SMF shall:
   ensure that Data Notification is enabled.
   trigger the Network triggered Service Request procedure for a LADN PDU Session to active the UP connection when the SMF receives downlink data or Data Notification from UPF.
c) When the SMF is informed that the UE presence in a LADN service area is UNKNOWN, the SMF may:
   ensure that Data Notification is enabled.

trigger the Network triggered Service Request procedure for a LADN PDU Session to active the UP connection when the SMF receives downlink data or Data Notification from UPF.

5.19.7 NAS Level Congestion Control

5.19.7.1 General

NAS level congestion control may be applied in general (i.e. for all NAS messages), per DNN, per S-NSSAI, per DNN and S-NSSAI, or for a specific group of UEs. NAS level congestion control is achieved by providing the UE a back-off timer. To avoid that large amounts of UEs initiate deferred requests (almost) simultaneously, the 5GC should select each back-off timer value so that the deferred requests are not synchronized. When the UE receives a back-off timer, the UE shall not initiate any NAS signalling with regards to the applied congestion control until the back-off timer expires or the UE receives a mobile terminated request from the network, or the UE initiates signalling for emergency services or high priority access.

AMFs and SMFs may apply NAS level congestion control, but should not apply NAS level congestion control for messages not subject to congestion control, e.g. messages for high priority access, emergency services and Data Off status change reporting.

5.19.7.2 General NAS Level Congestion Control

Under general overload conditions the AMF may reject NAS messages from UEs using any 5G-AN. When a NAS request is rejected, a Mobility Management back-off timer may be sent by the AMF and AMF may store the back-off time per UE if AMF maintains the UE context. The AMF may immediately reject any subsequent request from the UE before the stored back-off time is expired. While the Mobility Management back-off timer is running, the UE shall not initiate any NAS request except for Deregistration procedure and except for messages not subject to congestion control (e.g. messages for high priority access, emergency services and Data Off status change reporting) and mobile terminated services. After any such Deregistration procedure, the back-off timer continues to run. While the Mobility Management back-off timer is running, the UE is allowed to perform Mobility Registration Update if the UE is already in CM-CONNECTED state. If the UE receives a paging request or a NAS notification message from the AMF while the Mobility Management back off timer is running, the UE shall stop the Mobility Management back-off timer and initiate the Service Request procedure or the Mobility Registration Update procedure.

The Mobility Management back-off timer shall not impact Cell/RAT/Access Type and PLMN change. Cell/RAT and TA change do not stop the Mobility Management back-off timer. The Mobility Management back-off timer shall not be a trigger for PLMN reselection. The back-off timer is stopped as defined in TS 24.501 [47] when a new PLMN that is not an equivalent PLMN is accessed.

To avoid that large amounts of UEs initiate deferred requests (almost) simultaneously, the AMF should select the Mobility Management back-off timer value so that the deferred requests are not synchronized.

The AMF should not reject Registration Request message for Mobility Registration Update that are performed when the UE is already in CM-CONNECTED state.

The AMF may reject the Service Request message with a Mobility Management back-off timer when the UE is already in CM-CONNECTED state. If UE receives a DL NAS Transfer message from the AMF while the Mobility Management back off timer is running, the UE shall stop the Mobility Management back-off timer.

For CM-IDLE state mobility, the AMF may reject Registration Request messages for Mobility Registration Update and include a Mobility Management back off timer value in the Registration Reject message.

If UE registered in the same PLMN for 3GPP access and non-3GPP access and receives a Mobility Management back-off timer from AMF, the back-off timer is applied to both 3GPP access and non-3GPP access. If UE registered in different PLMN for 3GPP access and non-3GPP access and receives a Mobility Management back-off timer, the back-off timer is only applied to the PLMN that provided the timer to the UE.

If the AMF rejects Registration Request messages or Service Request with a Mobility Management back-off timer which is larger than the sum of the UE's Periodic Registration Update timer plus the Implicit Deregistration timer, the AMF should adjust the mobile reachable timer and/or Implicit Deregistration timer such that the AMF does not implicitly deregister the UE while the Mobility Management back-off timer is running.

NOTE: This is to minimize unneeded signalling after the Mobility Management back-off timer expires.

5.19.7.3 DNN Based Congestion Control

The use of the DNN based congestion control is for avoiding and handling of NAS signalling congestion associated with UEs with a particular DNN regardless of S-NSSAI. Both UEs and 5GC shall support the functions to provide DNN based congestion control.

SMFs may apply DNN based congestion control towards the UE by rejecting PDU Session Establishment Request message, or PDU Session Modification Request message except for 3GPP PS Data Off status change reporting towards a specific DNN, from the UE, with a back-off timer and the associated DNN. The SMF may release PDU Sessions belonging to a congested DNN by sending a PDU Session Release Request message towards the UE with a back-off timer. If back-off timer is set in the PDU Session Release Request message then the cause "reactivation requested" should not be set.

When DNN based congestion control is activated at AMF e.g., configured by OAM, the AMF provides a NAS Transport Error message for the NAS Transport message carrying an SM message, except for messages (e.g. for priority service, emergency service, Data Off status change reporting) not subject to congestion control, and in the NAS Transport Error message include a back-off timer and the associated DNN. If the UE indicates that the NAS SM message in the UL NAS Transport message is not subject to congestion control, AMF shall not reject the UL NAS Transport message and shall forward the NAS SM message to the corresponding SMF indicating that the message is not subject to congestion control. The SMF ensures that the NAS SM message is not subject to congestion control otherwise the SMF rejects the message, i.e. the SMF shall reject PDU Session Modification received if it is not for Data Off status reporting).

Upon reception of the back-off timer for a DNN, the UE shall take the following actions until the timer expires:

If DNN is provided in association with the back-off timer, the UE shall not initiate any Session Management procedures for the congested DNN. The UE may initiate Session Management procedures for other DNNs. The UE shall not initiate any Session Management procedure for the corresponding APN when UE moves to EPS;

Session Management requests of any PDU Session Type without DNN. The UE may initiate Session Management procedures for specific DNN;

Cell/TA/PLMN/RAT change, change of untrusted non-3GPP access network or change of Access Type does not stop the back-off timer;

The UE is allowed to initiate the Session Management procedures for high priority access and emergency services even when the back-off timer is running;

The UE is allowed to initiate the Session Management procedure for reporting Data Off status change to the network even when the back-off timer is running, and in this case the UE indicates in the UL NAS Transport message that the carried NAS SM message is not subject to congestion control as described in 3GPP TS 24.501 [47]; and If the UE receives a network initiated Session Management Request message for the congested DNN while the back-off timer is running, the UE shall stop the Session Management back-off timer associated with this DNN and respond to the 5GC.

The UE is allowed to initiate PDU Session Release procedure (e.g. sending PDU Session Release Request message) when the back-off timer is running.

NOTE 3: The UE does not delete the related back-off timer when disconnecting a PDU Session.

The UE shall support a separate back-off timer for every DNN that the UE may use. To avoid that large amounts of UEs initiate deferred requests (almost) simultaneously, the 5GC should select the back-off timer value so that deferred requests are not synchronized.

The DNN based Session Management congestion control is applicable to the NAS SM signalling initiated from the UE in the Control Plane. The Session Management congestion control does not prevent the UE to send and receive data or initiate Service Request procedures for activating User Plane connection towards the DNN(s) that are under Session Management congestion control.

5.19.7.4 S-NSSAI Based Congestion Control

The use of the S-NSSAI based congestion control is for avoiding and handling of NAS signalling congestion associated with UEs for a particular S-NSSAI. S-NSSAI based congestion control is applied as follows:

If an S-NSSAI is determined as congested, then the SMF may apply S-NSSAI based congestion control towards the UE for SM requests which includes an S-NSSAI, and provides a back-off timer, and an associated S-NSSAI and optionally a DNN;

The SMF may release PDU Sessions belonging to a congested S-NSSAI by sending a PDU Session Release Request message towards the UE with a back-off timer associated either to the S-NSSAI only (i.e. with no specific DNN) or to the S-NSSAI and a specific DN;

If S-NSSAI based congestion control is activated at AMF e.g., configured by OAM and an S-NSSAI is determined as congested, then the AMF applies S-NSSAI based congestion control towards the UE, by providing an NAS Transport Error message for the NAS Transport message carrying the SM message except for messages (e.g. for priority service, emergency service, Data Off status change reporting) not subject to congestion control) and in the NAS Transport Error message include a back-off timer associated either to an S-NSSAI only or to an S-NSSAI and a specific DNN. If the UE indicates that the NAS SM message in the UL NAS Transport message is not subject to congestion control, AMF shall not reject the UL NAS Transport message and shall forward the NAS SM message to the corresponding SMF which ensures that the NAS SM message is not subject to congestion control otherwise the SMF will reject the message;

Upon reception of a back-off timer with an associated S-NSSAI and optionally a DNN, the UE shall take the following actions:

If the back-off timer was associated with an S-NSSAI only (i.e. not with a DNN), the UE shall not initiate any Session Management procedures for the congested S-NSSAI until the timer is stopped or expires;

If the back-off timer was associated with an S-NSSAI and a DNN, then the UE shall not initiate any Session Management procedures for that combination of S-NSSAI and DNN until the timer is stopped or expires;

If the UE receives a network-initiated Session Management Request message for the congested S-NSSAI only (i.e. with no specific DNN) while the back-off timer associated with the S-NSSAI only is running, the UE shall stop this back-off timer and respond to the 5GC;

If the UE receives a network-initiated Session Management Request message for the congested S-NSSAI and a specific DNN while the back-off timer associated with the S-NSSAI and DNN is running, the UE shall stop this back-off timer and respond to the 5GC;

Cell/TA/PLMN/RAT change, change of untrusted non-3GPP access network or change of Access Type does not stop the back-off timer for the S-NSSAI or any combination of S-NSSAI and DNN;

The UE is allowed to initiate the Session Management procedures for high priority access and emergency services for the S-NSSAI even when the back-off timer associated to the S-NSSAI is running;

The UE is allowed to initiate the Session Management procedure for reporting Data Off status change for the S-NSSAI or the combination of S-NSSAI and DNN even when the back-off timer associated to the S-NSSAI or the combination of S-NSSAI and DNN is running and in this case the UE indicates in the UL NAS Transport message that the carried NAS SM message is not subject to congestion control as described in 3GPP TS 24.501 [47].

The UE is allowed to initiate PDU Session Release procedure (e.g. sending PDU Session Release Request message) when the back-off timer is running.

NOTE 1: The UE does not delete the related back-off timer when disconnecting a PDU Session. The UE shall support a separate back-off timer for every S-NSSAI and for every combination of S-NSSAI and DNN that the UE may use.

The back-off timer with an associated S-NSSAI and optionally a DNN shall not apply to Session Management procedures when UE moves from 5GS to EPS.

NOTE 2: The UE is allowed to imitate ESM procedures in EPS for the specific APN, and if an APN is congested in EPS, MME can send an ESM back-off timer for the APN to UE as specified in TS 23.401 [26].

To avoid that large amounts of UEs initiate deferred requests (almost) simultaneously, the 5GC should select the value of the back-off timer for the S-NSSAI based congestion control so that deferred requests are not synchronized.

The S-NSSAI based congestion control does not prevent the UE to send and receive data or initiate Service Request procedure for activating User Plane connection belonging to the S-NSSAI that is under the congestion control.

5.24 3GPP PS Data Off

This feature, when activated by the user, prevents traffic via 3GPP access of all IP packets, Unstructured and Ethernet data except for those related to 3GPP PS Data Off Exempt Services. The 3GPP PS Data Off Exempt Services are a set of operator services, defined in TS 22.011 [25] and TS 23.221 [23], that are the only allowed services when the 3GPP PS Data Off feature has been activated by the user. The 5GC shall support 3GPP PS Data Off operation in both non-roaming and roaming scenarios.

UEs may be configured with up to two lists of 3GPP PS Data Off Exempt Services and the list(s) are provided to the UEs by HPLMN via Device Management or UICC provisioning. When the UE is configured with two lists, one list is valid for the UEs camping in the home PLMN and the other list is valid for any VPLMN the UE is roaming in. When the UE is configured with a single list, without an indication to which PLMNs the list is applicable, then this list is valid for the home PLMN and any PLMN the UE is roaming in.

NOTE 1: The operator needs to ensure coordinated list(s) of 3GPP Data Off Exempt Services provisioned in the UE and configured in the network.

The UE reports its 3GPP PS Data Off status in PCO (Protocol Configuration Option) to (H-)SMF during UE requested PDU Session Establishment procedure.

NOTE 2: This also covers scenarios when the user activates/deactivates 3GPP PS Data Off while connected via Non-3GPP access only, and then a handover to 3GPP access occurs.

If 3GPP PS Data Off is activated, the UE prevents the sending of uplink IP packets, Unstructured and Ethernet data except for those related to 3GPP PS Data Off Exempt Services, based on the pre-configured list(s) of Data Off Exempt Services.

The UE shall immediately report a change of its 3GPP PS Data Off status in PCO by using UE requested PDU Session Modification procedure. This also applies to the scenario of inter-RAT mobility to NG-RAN and to scenarios where the 3GPP PS Data Off status is changed when the session management back-off timer is running as specified in clause 5.19.7.3 and clause 5.19.7.4. This also applies to the scenario that PDU Session exists for a UE in non-allowed area or not in allowed area as specified in clause 5.3.4.1, and to the scenario that PDU Session is still maintained for UE moving out of LADN area as specified in clause 5.6.5.

The additional behaviour of the SMF for 3GPP PS Data Off is controlled by local configuration or policy from the PCF as defined in TS 23.503 [45].

NOTE 3: For the PDU Session used for IMS services, the 3GPP Data Off Exempt Services are enforced in the IMS domain as specified TS 23.228 [15]. Policies configured in the (H-)SMF/PCF need to ensure those services are always allowed when the 3GPP Data Off status of the UE is set to "activated".

Example embodiments include, but are not limited to the following:

Embodiment A1. A network node configured to communicate with a wireless device (WD), the network node configured to, and/or comprising a radio interface and/or comprising processing circuitry configured to:
when the WD changes a Data Off status when the WD is in a non-allowed area, then accept and forward a session management message from the WD to a session management function, the session management message indicating that congestion control is activated.

Embodiment A2. The network node of Embodiment A1, wherein the session management function validates the session management message.

Embodiment A3. The network node of Embodiment A2, wherein if congestion control is applied but the session management message is not for reporting Data Off status change, the session management function rejects the session management message.

Embodiment B1. A method implemented in a network node, the method comprising:
when the WD changes a Data Off status when the WD is in a non-allowed area, then accepting and forwarding a session management message from the WD to a session management function, the session management message indicating that congestion control is activated.

Embodiment B2. The method of Embodiment B1, wherein the session management function validates the session management message.

Embodiment B3. The method of Embodiment B2, wherein if congestion control is applied but the session management message is not for reporting Data Off status change, the session management function rejects the session management message.

Embodiment C1. A wireless device (WD) configured to communicate with a network node, the WD configured to, and/or comprising a radio interface and/or processing circuitry configured to:
determine whether the WD is in an allowed area; and
when the WD is in a non-allowed area and congestion control is activated, indicate that a message for reporting a Data Off status change is exempted from congestion control.

Embodiment C2. The WD of Embodiment C1, wherein the indication from the WD is signaled by a new request type.

Embodiment D1. A method implemented in a wireless device (WD), the method comprising:
determining whether the WD is in an allowed area; and
when the WD is in a non-allowed area and congestion control is activated, indicating that a message for reporting a Data Off status change is exempted from congestion control.

Embodiment D2. The method of Embodiment D1, wherein the indication from the WD is signaled by a new request type.

Embodiment E1. A network node configured to communicate with a wireless device (WD), the network node configured to, and/or comprising a radio interface and/or comprising processing circuitry configured to:
when the WD changes a Data Off status when the WD is in a non-allowed area, then accept and forward a session management message from the WD to a session management function, the session management message indicating that congestion control is activated.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An access and mobility management Function, AMF, node configured to enable at least one congestion control process, the AMF node comprising:

processing circuitry configured to:
receive a first message including a modification request message, the first message including a first indication indicating that the modification request message is exempt from the at least one congestion control process, the first indication being provided by a predefined request type included in the modification request message;
forward the modification request message to a session management function, SMF, with a second indication indicating the at least one congestion control process is enabled at the AMF node; and
receive, from the SMF, a notification of a determination of whether the first message is accepted, the determination being one of:
the message being accepted based on the request type being for reporting Data Off status change; and
rejected based on the request type being not for reporting Data Off status change.

2. The AMF node of claim 1, wherein the first message is a non-access stratum, NAS, message.

3. The AMF node of claim 2, wherein the processing circuitry is further configured to:
receive a third indication that the modification request message has been accepted for exemption from the at least one congestion control process; and
transmit a fourth indication to wireless device indicating that the modification request message has been accepted for exemption from the at least one congestion control process.

4. The AMF node of claim 1, wherein the modification request message is forwarded to the Session Management Function, SMF, for validation as to whether the modification request message is exempt from the at least one congestion control process.

5. The AMF node of claim 1, wherein the processing circuitry is further configured to:
receive a third indication that the modification request message has been accepted for exemption from the at least one congestion control process; and
transmit a fourth indication to wireless device indicating that the modification request message has been accepted for exemption from the at least one congestion control process.

6. A method implemented in an access and mobility management function, AMF, node that is configured to enable at least one congestion control process, the method comprising:
receiving a first message including a modification request message, the first message including a first indication indicating that the modification request message is exempt from the at least one congestion control process, the first indication being provided by a predefined request type included in the modification request message;
forwarding the modification request message to a session management function, SMF, with a second indication indicating that at least one congestion control process is enabled at the AMF node; and
receiving, from the SMF, a notification of a determination of whether the first message is accepted, the determination being one of:
the message being accepted based on the request type being for reporting Data Off status change; and
rejected based on the request type being not for reporting Data Off status change.

7. The method of claim 6, wherein the first message is a non-access stratum, NAS, message.

8. The method of claim 6, wherein the modification request message is forwarded to a Session Management Function, SMF, for validation as to whether the modification request message is exempt from the at least one congestion control process.

9. The method of claim 6, further comprising:
receiving a third indication that the modification request message has been accepted for exemption from the at least one congestion control process; and
transmitting a fourth indication to wireless device indicating that the modification request message has been accepted for exemption from the at least one congestion control process.

10. A session management function, SMF, node, comprising:
processing circuitry configured to:
receive a first message including a modification request message, the first message including a first indication indicating that the modification request message is exempt from at least one congestion control process, the first indication being provided by a predefined request type included in the modification request message;
receive a second indication with the modification request message, the second indication indicating at least one congestion control process is enabled at an access and mobility management function, AMF, node;
validate that the modification request message is exempt from the at least one congestion control process; and
notify the AMF node of the validation, the validation being one of:
the message being accepted based on the request type being for reporting Data Off status change; and
rejected based on the request type being not for reporting Data Off status change.

11. A method implemented in a session management function, SMF, node, the method comprising:
receiving a first message including a modification request message, the first message including a first indication indicating that the modification request message is exempt from at least one congestion control process, the first indication being provided by a predefined request type included in the modification request message;
receiving a second indication with the modification request message, the second indication indicating at least one congestion control process is enabled at an access and mobility management function, AMF, node;
validating that the modification request message is exempt from the at least one congestion control process; and
notifying the AMF node of the validation, the validation being one of:
the message being accepted based on the request type being for reporting Data Off status change; and
rejected based on the request type being not for reporting Data Off status change.

12. The method of claim 11, wherein the first indication is provided with the modification request message when the at least one congestion control process is enabled at the AMF node.

* * * * *